United States Patent
Mukasa (10) Patent No.: US 11,714,228 B2
(45) Date of Patent: Aug. 1, 2023

(54) OPTICAL FIBER AND METHOD OF MANUFACTURING OPTICAL FIBER

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 59 days.

(21) Appl. No.: 17/445,115

(22) Filed: Aug. 16, 2021

(65) Prior Publication Data
US 2021/0373228 A1 Dec. 2, 2021

Related U.S. Application Data

(63) Continuation of application No. PCT/JP2020/006410, filed on Feb. 19, 2020.

(30) Foreign Application Priority Data

Feb. 25, 2019 (JP) .................. 2019-032023

(51) Int. Cl.
*C03B 37/014* (2006.01)
*G02B 6/02* (2006.01)
(Continued)

(52) U.S. Cl.
CPC .......... *G02B 6/028* (2013.01); *G02B 6/02238* (2013.01); *G02B 6/02395* (2013.01);
(Continued)

(58) Field of Classification Search
CPC .............. C03B 37/014; C03B 2201/31; C03B 2203/22; C03B 2203/23; G02B 6/02238;
(Continued)

(56) References Cited

U.S. PATENT DOCUMENTS 7,254,305 B2 8/2007 Mishra
7,620,282 B2 * 11/2009 Bickham .............. G02B 6/0365
385/124
(Continued)

FOREIGN PATENT DOCUMENTS

CN 104316994 A 1/2015
JP 2008-139887 A 6/2008
(Continued)

OTHER PUBLICATIONS

International Search Report dated Apr. 28, 2020 in PCT/JP2020/006410 filed on Feb. 19, 2020, 3 pages.
(Continued)

*Primary Examiner* — Ryan A Lepisto
(74) *Attorney, Agent, or Firm* — Oblon, McClelland, Maier & Neustadt, L.L.P.

(57) ABSTRACT

An optical fiber includes: a central core portion; an intermediate layer; a trench layer; and a cladding portion. Further, relationships $\Delta 1 > \Delta 2 > \Delta 3$ and $0 > \Delta 3$ are satisfied, where $\Delta 1$, $\Delta 2$, and $\Delta 3$ are a relative refractive-index difference of the central core portion, the intermediate layer, and the trench layer, respectively, with respect to the cladding portion, $\Delta 1$ is equal to or larger than 0.34% and equal to or smaller than 0.37%, $|\Delta 3|$ is equal to or larger than 0.1% and equal to or smaller than 0.25%, $\Delta 1 \times |\Delta 3|$ is equal to or smaller than $0.08\%^2$, a mode field diameter at a wavelength of 1310 nm is equal to or larger than 8.8 μm, and a transmission loss at a wavelength of 1550 nm is equal to or smaller than 0.195 dB/km.

10 Claims, 4 Drawing Sheets

(51) Int. Cl.
*G02B 6/028* (2006.01)
*G02B 6/036* (2006.01)

(52) U.S. Cl.
CPC ............ *G02B 6/036* (2013.01); *C03B 37/014* (2013.01); *C03B 2201/31* (2013.01); *C03B 2203/22* (2013.01); *C03B 2203/23* (2013.01); *G02B 6/0365* (2013.01)

(58) Field of Classification Search
CPC .... G02B 6/02395; G02B 6/028; G02B 6/036; G02B 6/0365
See application file for complete search history.

(56) References Cited

U.S. PATENT DOCUMENTS

| | | | |
|---|---|---|---|
| 2006/0039665 A1* | 2/2006 | Matsuo | G02B 6/03672 385/127 |
| 2007/0147756 A1 | 6/2007 | Matsuo et al. | |
| 2008/0056654 A1 | 3/2008 | Bickham et al. | |
| 2008/0152288 A1 | 6/2008 | Flammer et al. | |
| 2009/0263092 A1 | 10/2009 | Flammer et al. | |
| 2010/0046899 A1 | 2/2010 | Bickham et al. | |
| 2011/0064368 A1 | 3/2011 | Bookbinder et al. | |
| 2013/0094825 A1 | 4/2013 | Konishi et al. | |
| 2013/0272669 A1 | 10/2013 | Oyamada et al. | |
| 2013/0287352 A1 | 10/2013 | Oyamada | |
| 2017/0285260 A1 | 10/2017 | Bookbinder et al. | |

FOREIGN PATENT DOCUMENTS

| | | |
|---|---|---|
| JP | 2010-503019 A | 1/2010 |
| JP | 2010-181641 A | 8/2010 |
| JP | 2011-203552 A | 10/2011 |
| JP | 4833071 B2 | 12/2011 |
| JP | 2012-212115 A | 11/2012 |
| JP | 2013-235261 A | 11/2013 |
| JP | 2013-242545 A | 12/2013 |
| JP | 2014-010412 A | 1/2014 |
| WO | WO 2004/092794 A1 | 10/2004 |
| WO | WO 2010/093187 A2 | 8/2010 |
| WO | WO 2017/172714 A1 | 10/2017 |

OTHER PUBLICATIONS

Japanese Office Action dated May 25, 2021 in Japanese Patent Application No. 2019-032023, 6 pages (with English Machine Translation).

Extended European Search Report dated Oct. 7, 2022 in corresponding European Patent Application No. 20763528.5, 8 pages.

* cited by examiner

OPTICAL FIBER AND METHOD OF MANUFACTURING OPTICAL FIBER

CROSS-REFERENCE TO RELATED APPLICATION(S)

This application is a continuation of International Application No. PCT/JP2020/006410, filed on Feb. 19, 2020 which claims the benefit of priority of the prior Japanese Patent Application No. 2019-032023, filed on Feb. 25, 2019, the entire contents of which are incorporated herein by reference.

BACKGROUND

The present disclosure relates to an optical fiber and a method of manufacturing the optical fiber.

In the related art, to realize a single-mode optical fiber with low bending loss characteristics as defined by, for example, International Telecommunication Union Telecommunication Standardization Sector (ITU-T) G.657.A2 or the like, an optical fiber having a three-layer structure including a trench structure has been disclosed (Japanese Patent No. 4833071 and Japanese Laid-open Patent Publication Nos. 2008-139887, 2010-181641, 2012-212115, 2013-242545, and 2013-235261). The optical fiber having the three-layer structure includes, for example, a central core portion, an intermediate layer that is formed on an outer periphery of the central core portion, a trench layer that is formed on an outer periphery of the intermediate layer, and a cladding portion that is formed on an outer periphery of the trench layer.

Optical characteristics of the optical fiber having the three-layer structure are designed by setting structural parameters, such as a relative refractive-index difference $\Delta 1$ of the central core portion, a relative refractive-index difference $\Delta 2$ of the intermediate layer, a relative refractive-index difference $\Delta 3$ of the trench layer, a core diameter $2a$ of the central core portion, an inner diameter $2b$ of the trench layer (in other words, an outer diameter of the intermediate layer), and an outer diameter $2c$. Meanwhile, in general, $\Delta 3$ is a negative value and $\Delta 2$ is a value smaller than $\Delta 1$. In Japanese Patent No. 4833071 and Japanese Laid-open Patent Publication Nos. 2008-139887, 2010-181641, 2012-212115, 2013-242545, and 2013-235261, various combinations of values of the structural parameters as described above are disclosed.

SUMMARY

There is a need for providing an optical fiber that has low bending loss characteristics, low transmission loss characteristics, and high manufacturability and a method of manufacturing the optical fiber.

According to an embodiment, an optical fiber includes: a central core portion that is made of silica based glass containing germanium (Ge); an intermediate layer that is made of silica based glass and formed on an outer periphery of the central core portion; a trench layer that is made of silica based glass and formed on an outer periphery of the intermediate layer; and a cladding portion that is made of silica based glass and formed on an outer periphery of the trench layer. Further, relationships $\Delta 1 > \Delta 2 > \Delta 3$ and $0 > \Delta 3$ are satisfied, where $\Delta 1$ is a relative refractive-index difference of the central core portion with respect to the cladding portion, $\Delta 2$ is a relative refractive-index difference of the intermediate layer with respect to the cladding portion, and $\Delta 3$ is a relative refractive-index difference of the trench layer with respect to the cladding portion, $\Delta 1$ is equal to or larger than 0.34% and equal to or smaller than 0.37%, $|\Delta 3|$ is equal to or larger than 0.1% and equal to or smaller than 0.25%, $\Delta 1 \times |\Delta 3|$ is equal to or smaller than 0.08%$^2$, a mode field diameter at a wavelength of 1310 nm is equal to or larger than 8.8 μm, and a transmission loss at a wavelength of 1550 nm is equal to or smaller than 0.195 dB/km.

DETAILED DESCRIPTION

In the related art, even in the disclosed optical fibers, there is room for improvement from the standpoint of manufacturability. For example, if $\Delta 1$ is designed to be high, a use amount of a dopant for improving a refractive index at the time of manufacturing increases. Similarly, if an absolute value of $\Delta 3$ is designed to be high or a width of the intermediate layer (a difference between the outer diameter and the inner diameter) is designed to be high, a use amount of a dopant for reducing a refractive index at the time of manufacturing increases. In contrast, particularly with regard to $\Delta 1$, if $\Delta 1$ is designed to be extremely low, it is necessary to precisely control the use amount of the dopant and an influence of disturbance increases, so that a manufacturing error may increase.

Furthermore, with regard to the optical fiber, it is always desired that a transmission loss (loss coefficient) is low.

Embodiments of the present disclosure will be described in detail below with reference to the drawings. The present disclosure is not limited by the embodiments described below. Further, in each of the drawings, the same or corresponding structural elements are appropriately denoted by the same reference symbols, and explanation of the structural elements will be omitted appropriately. Furthermore, in the present specification, a cutoff wavelength is an effective cutoff wavelength and indicates a cable cutoff wavelength that is defined by International Telecommunication Union Telecommunication Standardization Sector (ITU-T) G.650.1. Moreover, other terms that are not specifically defined in the present specification conform to definitions and measurement methods described in G.650.1 and G.650.2.

First Embodiment

Figure 1:
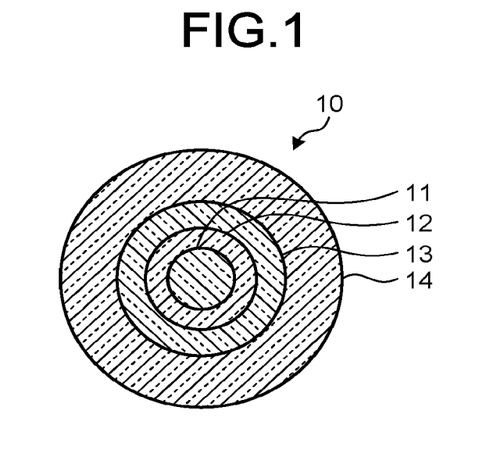
FIG. 1 is a schematic cross-sectional view of an optical fiber according to a first embodiment.

FIG. 1 is a schematic cross-sectional view of an optical fiber according to a first embodiment. An optical fiber 10 is made of silica based glass, and includes a central core portion 11, an intermediate layer 12 that is formed on an outer periphery of the central core portion 11, a trench layer 13 that is formed on an outer periphery of the intermediate layer 12, and a cladding portion 14 that is formed on an outer periphery of the trench layer 13.

Figure 2:
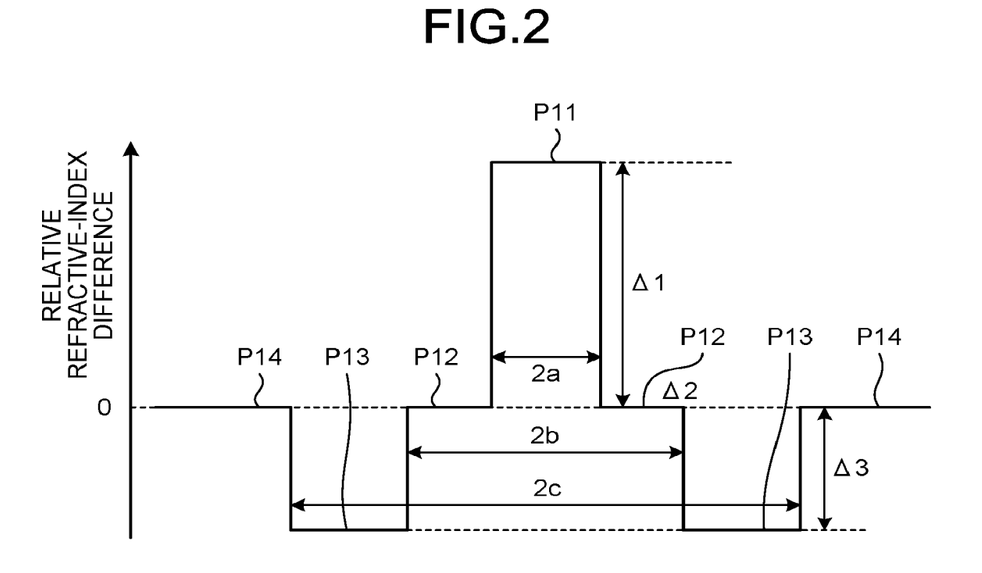
FIG. 2 is a diagram illustrating a refractive index profile of the optical fiber illustrated in FIG. 1.

FIG. 2 is a diagram illustrating a refractive index profile of the optical fiber 10. A profile P11 is a refractive index profile of the central core portion 11 and is what called a step-in-step type. A profile P12 is a refractive index profile of the intermediate layer 12. A profile P13 is a refractive index profile of the trench layer 13. A profile P14 is a refractive index profile of the cladding portion 14.

Structural parameters of the optical fiber 10 will be described. First, a core diameter of the central core portion 11 is $2a$. Further, an outer diameter of the intermediate layer 12, that is, an inner diameter of the trench layer 13, is $2b$, and an outer diameter of the trench layer 13 is $2c$. Therefore, a width (trench width) of the trench layer 13 is (c-b). Furthermore, a relative refractive-index difference of a maximum refractive index of the central core portion 11 with respect to a refractive index of the cladding portion 14 is $\Delta 1$. A relative refractive-index difference of a refractive index of the intermediate layer 12 with respect to the refractive index of the cladding portion 14 is $\Delta 2$. A relative refractive-index difference of a refractive index of the trench layer 13 with respect to the refractive index of the cladding portion 14 is $\Delta 3$. As for $\Delta 1$, $\Delta 2$, and $\Delta 3$, $\Delta 1 > \Delta 2 > \Delta 3$ and $0 > \Delta 3$. In other words, $\Delta 3$ is a negative value, and therefore, the trench layer 13 is able to improve the low bending loss characteristics of the optical fiber 10.

Constituent materials of the optical fiber 10 will be described below. The central core portion 11 is made of silica glass doped with a dopant, such as germanium (Ge), for adjusting the refractive index to improve the refractive index. The trench layer 13 is made of silica glass doped with a dopant, such as fluorine (F), for reducing the refractive index. The cladding portion 14 is made of pure silica glass that does not contain a dopant, such as Ge or F, for adjusting the refractive index. The intermediate layer 12 may be made of pure silica glass or may be doped with a certain amount of a dopant for adjusting the refractive index. However, the constituent materials and the dopants are not specifically limited as long as inequalities with respect to $\Delta 1$, $\Delta 2$, and $\Delta 3$ as described above are true.

In the optical fiber 10, with regard to $\Delta 1$, $\Delta 2$, and $\Delta 3$, with the aid of Ge, $\Delta 1$ is equal to or larger than 0.34% and equal to or smaller than 0.37%, $|\Delta 3|$ that is an absolute value of $\Delta 3$ is equal to or larger than 0.1% and equal to or smaller than 0.25%, and $\Delta 1 \times |\Delta 3|$ is smaller than $0.08\%^2$. In this manner, if $\Delta 1$ is equal to or larger than 0.34% and equal to or smaller than 0.37%, it is possible to reduce the use amount of Ge that is the dopant for improving the refractive index at the time of manufacturing, it is possible to easily control the use amount of the dopant, and it is possible to relatively increase strength against disturbance, so that it is possible to reduce a manufacturing error. Furthermore, because it is possible to reduce the use amount of Ge, it is possible to reduce a light loss in the central core portion 11 and achieve a transmission loss equal to or smaller than 0.195 dB/km at a wavelength of 1550 nm, as will be described later. Furthermore, if $|\Delta 3|$ is equal to or smaller than 0.25%, it is possible to reduce the use amount of the dopant for reducing the refractive index. If $|\Delta 3|$ is equal to or larger than 0.10%, it is possible to easily control the use amount of the dopant for reducing the refractive index and it is possible to reduce a manufacturing error. As a result, it is possible to further improve the manufacturability of the optical fiber 10. Moreover, if $\Delta 1 \times |\Delta 3|$ is equal to or smaller than $0.08\%^2$, it is possible to effectively improve an effect of reduction of the use amounts of the dopants, an effect of simplicity of control, and an effect of reduction of the manufacturing error, so that it is possible to improve manufacturability of the optical fiber 10. Furthermore, the optical fiber 10 can have a mode field diameter (MFD) equal to or larger than 8.8 µm at a wavelength of 1310 nm, and can be applied for various use purposes.

As for $|\Delta 3|$, if $|\Delta 3|$ is smaller than 0.25%, in particular, if $|\Delta 3|$ is equal to or smaller than 0.20%, it is possible to further reduce the use amount of the dopant. Meanwhile, if $|\Delta 3|$ is equal to or larger than 0.10%, $\Delta 1 \times |\Delta 3|$ is equal to or larger than $0.034\%^2$. Therefore, it is preferable that $\Delta 1 \times |\Delta 3|$ is equal to or larger than $0.034\%^2$.

While details will be described later, examples of preferable ranges of the other structural parameters are as follows: $\Delta 2$ is equal to or larger than −0.04% and equal to or smaller than 0.04%, for example. b/a is equal to or larger than 1.8 and equal to or smaller than 3.6, for example. c/a is equal to or larger than 3.2 and equal to or smaller than 5.2, for example.

By appropriately combining the values of the structural parameters as described above, the optical fiber 10 can have an effective cutoff wavelength equal to or smaller than 1260 nm, as will be described in detail later. The optical fiber 10 can have the MFD equal to or smaller than 9.5 µm at a wavelength of 1310 nm. Furthermore, the optical fiber 10 can have a bending loss equal to or smaller than 1.59 dB/m at a wavelength of 1550 nm when bending is made at a diameter of 20 mm (hereinafter, the bending loss at a wavelength of 1550 nm when bending is made at the diameter of 20 mm may be simply referred to as a macrobending loss). Moreover, the optical fiber 10 can have a zero-dispersion wavelength equal to or larger than 1300 nm and equal to or smaller than 1324 nm and have a dispersion slope equal to or smaller than 0.092 ps/nm$^2$/km at the zero-dispersion wavelength. As a result, it is possible to provide the optical fiber 10 that meets the standard defined by ITU-T G.652 (hereinafter, may be described as G.652 standard), for example. Furthermore, if the MFD is equal to or smaller than 9.2 µm, it is possible to provide the optical fiber 10 that meets G.657A standard, in particular, G.657 A2 standard. Meanwhile, the value of 1.59 dB/m of the macrobending loss is a converted value of 0.1 dB/turn in G.657 A2 standard. Moreover, it may be possible to appropriately combine the values of the structural parameters such that the effective cutoff wavelength is equal to or smaller than 1530 nm, which meets G.654 standard.

Figure 3:
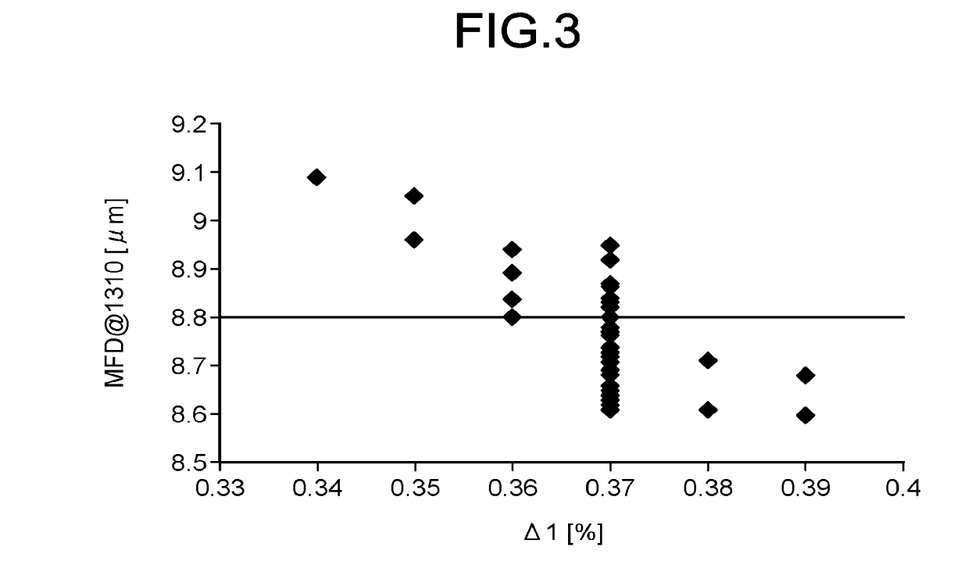
FIG. 3 is a diagram illustrating a relationship between $\Delta 1$ and an MFD.

Details will be described below using results of simulation calculation. FIG. 3 is a diagram illustrating a relationship between $\Delta 1$ and the MFD at a wavelength of 1310 nm based on the simulation calculation. Meanwhile, data points represent calculation results that are obtained by setting $\Delta 1$, $\Delta 2$, $\Delta 3$, $2a$, $2b$, and $2c$, which are the structural parameters, to various values that meet G.657A standard. As illustrated in FIG. 3, $\Delta 1$ and the MFD are highly correlated with each other, and it is necessary that $\Delta 1$ is equal to or larger than 0.34% and equal to or smaller than 0.37% to obtain the MFD equal to or larger than 8.8 µm. Meanwhile, as described above, $\Delta 1$ with a relatively small value as described above is preferable in terms of reduction of the transmission loss.

Figure 4:
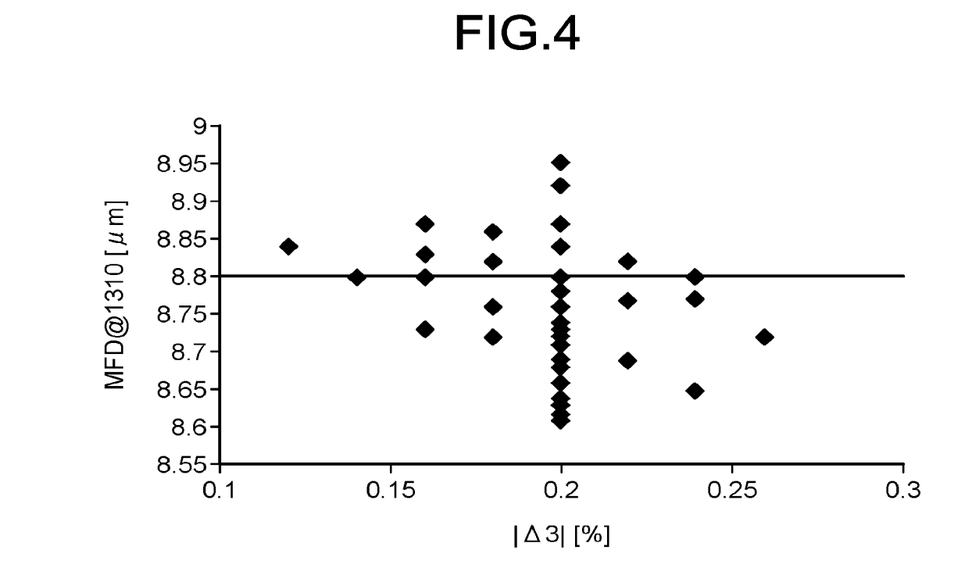
FIG. 4 is a diagram illustrating a relationship between $|\Delta 3|$ and the MFD.

FIG. 4 is a diagram illustrating a relationship between $|\Delta 3|$ and the MFD. Meanwhile, data points represent calculation results that are obtained by fixing $\Delta 1$ to 0.37% and setting $|\Delta 3|$, $\Delta 2$, $2a$, $2b$, and $2c$ to various values that meet G.657A standard. As illustrated in FIG. 4, it is confirmed that $|\Delta 3|$ equal to or smaller than 0.25% is preferable, and $|\Delta 3|$ equal to or smaller than 0.20% is more preferable.

Figure 5:
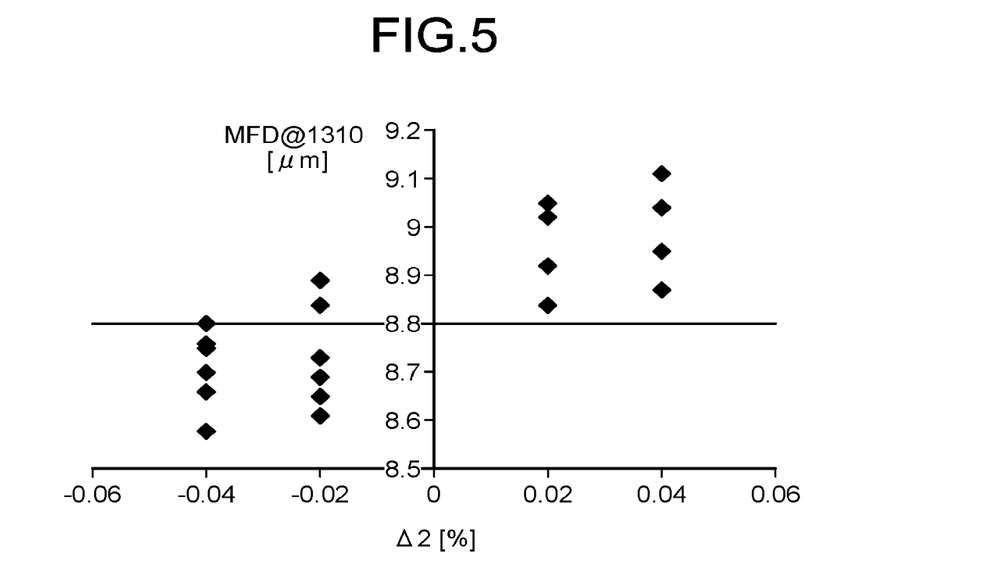
FIG. 5 is a diagram illustrating a relationship between $\Delta 3$ and the MFD.

FIG. 5 is a diagram illustrating a relationship between |Δ2| and the MFD. Meanwhile, data points represent calculation results that are obtained by fixing |Δ3| to 0.2% and setting Δ2, Δ1, 2a, 2b, and 2c to various values that meet G.657A standard. As illustrated in FIG. 5, it is confirmed that Δ2 equal to or larger than −0.02% and equal to or smaller than 0.04% is preferable. Meanwhile, while |Δ3| is fixed to 0.2% in FIG. 5, the present inventors confirmed that, through calculation using appropriate combinations of Δ1, Δ2, Δ3, 2a, 2b, and 2c, Δ2 equal to or larger than −0.04% and equal to or smaller than 0.04% is preferable to obtain the MFD equal to or larger than 8.8 μm while meeting G.657A standard.

The structural parameters of the optical fiber 10 were optimized based on examination on the simulation results as described above, and it was confirmed that the MFD at a wavelength of 1310 nm was 8.8 μm and the macrobending loss, the zero-dispersion wavelength, the dispersion slope, and the cutoff wavelength had preferable characteristics (for example, characteristics that meet G.657 A2 standard) when Δ1 was equal to or larger than 0.34% and equal to or smaller than 0.37%, Δ2 was equal to or larger than −0.04% and equal to or smaller than 0.04%, |Δ3| was equal to or smaller than 0.25% (in particular, equal to or smaller than 0.20% and equal to or larger than 0.1%) and Δ1×|Δ3| was equal to or smaller than 0.08%$^2$.

Figure 6:
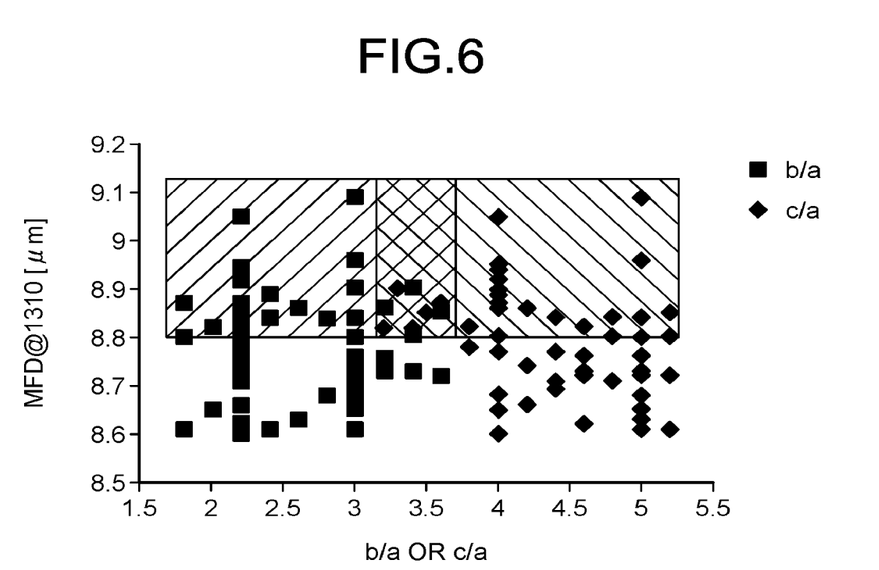
FIG. 6 is a diagram illustrating a relationship between b/a or c/a and the MFD.

FIG. 6 is a diagram illustrating a relationship between b/a or c/a and the MFD. FIG. 6 illustrates a case in which Δ1 is equal to or larger than 0.34% and equal to or smaller than 0.37%, Δ2 is equal to or larger than −0.04% and equal to or smaller than 0.04%, |Δ3| is equal to or smaller than 0.25%, Δ1×|Δ3| is equal to or smaller than 0.08%$^2$, and the macrobending loss, zero-dispersion wavelength, the dispersion slope, and the cutoff wavelength meet G.657 A2 standard. Rectangular data points are data points that represent b/a, and a region represented by oblique lines extending from the upper right to the lower left is a region in which data points at which the MFD is equal to or larger than 8.8 μm are present. Further, diamond-shaped data points are data points that represent c/a, and a region represented by oblique lines extending from the upper left to the lower right is a region in which data points at which the MFD is equal to or larger than 8.8 μm are present.

As illustrated in FIG. 6, it is confirmed that, to realize the MFD equal to or larger than 8.8 μm, it is preferable that b/a is equal to or larger than 1.8 and equal to or smaller than 3.6, and c/a is equal to or larger than 3.2 and equal to or smaller than 5.2.

Meanwhile, a range of b/a equal to or larger than 1.8 and equal to or smaller than 3.6 and a range of c/a equal to or larger than 3.2 and equal to or smaller than 5.2 are preferable examples, and the present disclosure is not limited to these examples. For example, as can be understood from FIG. 5, b/a and c/a are not highly correlated with the MFD. Therefore, it may be possible to realize, with b/a and c/a out of the ranges as described above, the characteristics as follows: Δ1 is equal to or larger than 0.34% and equal to or smaller than 0.37%, |Δ3| is equal to or larger than 0.1% and equal to or smaller than 0.25%, Δ1×|Δ3| is equal to or smaller than 0.08%$^2$, the MFD at a wavelength of 1310 nm is equal to or larger than 8.8 μm, and the transmission loss at a wavelength of 1550 nm is equal to or smaller than 0.195 dB/km. However, the range of b/a equal to or larger than 1.8 and equal to or smaller than 3.6 and the range of c/a equal to or larger than 3.2 and equal to or smaller than 5.2 are values that are easily implemented in manufacturing, and are preferable values even from the standpoint of the manufacturability.

Meanwhile, through the examination made by the present inventors, it was confirmed that, as for the core diameter 2a of the central core portion 11, it was preferable to increase 2a as much as possible in a certain range in which the effective cutoff wavelength was equal to or smaller than 1260 nm, in terms of an increase of the MFD and reduction of the macrobending loss. For example, it is desirable to select a value of 2a such that the effective cutoff wavelength is equal to or larger than 1150 nm and equal to or smaller than 1260 nm. It was confirmed that, with use of 2a in the range as described above, it is possible to realize characteristics that meet G.657 A2 standard or characteristics similar to the characteristics that meet G.657 A2 standard while realizing a large MFD (equal to or larger than 8.8 μm at a wavelength of 1310 nm) at the same time.

Meanwhile, the optical fiber 10 according to the present embodiment can be manufactured by a well-known manufacturing method that includes a process of manufacturing an optical fiber preform and a process of manufacturing the optical fiber by heating and melting the optical fiber preform and performing drawing.

In this case, the optical fiber preform includes portions that serve as the central core portion 11, the intermediate layer 12, the trench layer 13, and the cladding portion 14 of the optical fiber 10. The optical fiber preform can be manufactured by using a vapor phase axial deposition (VAD) method, a modified chemical vapor deposition (MCVD) method, a plasma chemical vapor deposition (PCVD) method, a sol-gel method, or the like. For example, it is possible to manufacture the optical fiber preform by forming portions that serve as the central core portion 11, the intermediate layer 12, the trench layer 13, and a part of the cladding portion 14 of the optical fiber 10 by using the VAD method, and thereafter forming a glass layer that serves as remaining portions of the cladding portion 14 by using an outside vapor deposition (OVD) method, for example.

Furthermore, when an optical fiber is to be manufactured by performing drawing on the optical fiber preform, a coating layer made of ultraviolet (UV)-curable resin is formed by using a well-known method. It is preferable that the coating layer as described above has a two-layer structure. Further, for example, an outer diameter (cladding diameter) of the cladding portion 14 is 125 μm, and an outer diameter (coating diameter) of the coating layer is 250 μm, but the diameters are not specifically limited. For example, the diameters may be reduced or increased as long as there is no problem with certain characteristics, such as the transmission loss, a microbending loss, handling performance, and mechanical strength. Furthermore, the coating layer need not always have the two-layer structure. For example, as is commonly known, it may be possible to reduce the coating diameter to less than 200 μm and reduce the cladding diameter to less than 125 μm to realize a high-density optical fiber cable.

To examine the transmission loss of the optical fiber according to one embodiment of the present disclosure, the present inventors manufactured an optical fiber preform by using the VAD method, performed drawing on the optical fiber preform, and generated prototype fibers, each of which had a coating layer that was made of UV-curable resin and that had a two-layer structure, and each of which had a cladding diameter of 125 μm and a coating diameter of 250 μm. The prototype optical fibers were made by setting various structural parameters such that Δ1 was equal to or larger than 0.34% and equal to or smaller than 0.37%, Δ2 was equal to or larger than −0.04% and equal to or smaller than 0.04%, |Δ3| was equal to or smaller than 0.25%, Δ1×|Δ3| was equal to or smaller than 0.08%², b/a was equal to or larger than 1.8 and equal to or smaller than 3.6, c/a was equal to or larger than 3.2 and equal to or smaller than 5.2, and the MFD at a wavelength of 1310 nm was 8.8 μm, and by setting Δ1 to various values in a range of 0.33% to 0.44%. Then, transmission losses of the optical fibers at a wavelength of 1550 nm were checked.

Figure 7:
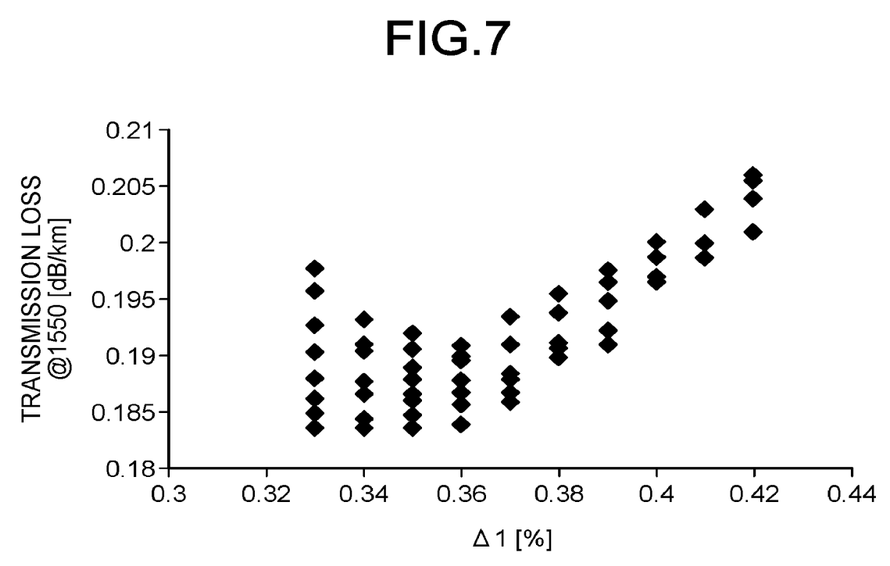
FIG. 7 is a diagram illustrating a relationship between $\Delta 1$ and a transmission loss.

FIG. 7 is a diagram illustrating a relationship between Δ1 and the transmission loss. As illustrated in FIG. 7, while certain fluctuation is caused by influence of other structural parameters, Δ1 and the transmission loss at a wavelength of 1550 nm are highly correlated with each other. For example, when Δ1 was increased to 0.42%, the transmission loss was increased. The reason for this may be that a Rayleigh scattering loss and a structural imperfection loss were increased due to an increase in an additive amount of Ge as a dopant used to increase Δ1. In contrast, if Δ1 is reduced, it is possible to reduce the Rayleigh scattering loss, but a microbending loss may increase depending on a design of the refractive index profile; therefore, a problem that the transmission loss increases only by, for example, winding the optical fiber around a bobbin may occur. Furthermore, when Δ1 was reduced to, for example, 0.33%, fluctuation of the transmission loss was increased. The reason for this may be that, if Δ1 is low, a change of the characteristics of the optical fiber becomes more susceptible to a change of a shape of the refractive index profile. In this case, fluctuation of the characteristics of the optical fiber is likely to occur due to fluctuation of the refractive index profile caused by a manufacturing error or the like, so that the manufacturability may be reduced.

In contrast, the optical fiber 10 according to one embodiment of the present disclosure has Δ1 equal to or larger than 0.34% and equal to or smaller than 0.37% with the aid of Ge, so that there is an advantage in that the MFD at a wavelength of 1310 nm can be increased to 8.8 μm and a low transmission loss equal to or smaller than 0.195 dB/km can be stably obtained.

A specific example of changes of the optical characteristics of the optical fiber 10 when the structural parameters are changed will be described using results of simulation calculation. First, changes of the optical characteristics were calculated with respect to structural parameter combinations indicated by No. 1 to No. 9 in Table 1. In No. 1 to No. 9, Δ1 was changed in a range of 0.34% to 0.37%. Δ2 was changed in a range of 0% to 0.04%. |Δ3| was changed in a range of 0.12% to 0.20%, Δ1×|Δ3| was changed in a range of 0.0444%² to 0.0740%². b/a was changed in a range of 2.2 to 3.4. c/a was changed in a range of 4.0 to 5.0. 2a was changed in a range of 7.9 μm to 8.5 μm.

TABLE 1

| | Δ1 [%] | Δ2 [%] | Δ3 [%] | Δ1 × |Δ3| [%²] | b/a | c/a | 2a [μm] |
|---|---|---|---|---|---|---|---|
| No. 1 | 0.34 | 0 | −0.20 | 0.0680 | 3.0 | 5.0 | 8.2 |
| No. 2 | 0.35 | 0 | −0.20 | 0.0700 | 2.2 | 4.0 | 8.5 |
| No. 3 | 0.35 | 0 | −0.20 | 0.0700 | 3.0 | 5.0 | 8.1 |
| No. 4 | 0.36 | 0 | −0.20 | 0.0720 | 2.2 | 4.0 | 8.4 |
| No. 5 | 0.37 | 0.04 | −0.20 | 0.0740 | 2.2 | 4.0 | 7.9 |
| No. 6 | 0.37 | 0 | −0.20 | 0.0740 | 2.6 | 4.0 | 8.3 |
| No. 7 | 0.37 | 0 | −0.20 | 0.0740 | 3.4 | 5.0 | 8.1 |
| No. 8 | 0.37 | 0 | −0.16 | 0.0592 | 2.2 | 4.0 | 8.4 |
| No. 9 | 0.37 | 0 | −0.12 | 0.0444 | 3.0 | 5.0 | 8.2 |

Subsequently, the optical characteristics were calculated with respect to the structural parameter combinations in Table 1. Furthermore, an optical fiber preform was manufactured by using the VAD method by using each of the combinations as design values, drawing was performed on the optical fiber preform, and a prototype fiber that had a coating layer made of UV-curable resin and having a two-layer structure, that had a cladding diameter of 125 μm, and that had a coating diameter of 250 μm was made.

Table 2 lists values of the zero-dispersion wavelength, the dispersion slope, the MFD, the cutoff wavelength, and the macrobending loss among the optical characteristics, as results of simulation calculation performed with respect to No. 1 to No. 9. Further, in Table 2, the transmission loss is listed in addition to the above-described optical characteristics of the prototype optical fibers denoted by No. 1 to No. 9. Meanwhile, in Table 2, standard values of G.657 A2 standard are listed as a standard. As can be understood from Table 2, it was confirmed that the result of the simulation calculation with respect to each of No. 1 to No. 9 met G.657 A2 standard. Further, it was confirmed that the MFD was equal to or larger than 8.8 μm and the transmission loss was equal to or smaller than 0.195 dB/km. Furthermore, it was confirmed that, with regard to the zero-dispersion wavelength, the dispersion slope, the MFD, the cutoff wavelength, and the macrobending loss, the optical characteristics obtained through the simulation calculation and the optical characteristics of the prototype optical fibers almost matched with each other.

TABLE 2

| | Zero-dispersion wavelength [nm] | Dispersion slope [ps/nm²/km] @zero-dispersion wavelength | MFD [μm] @1310 nm | Cutoff wavelength [nm] @22 m | Macrobending loss [dB/m @20 mm] @1550 nm | Transmission loss [dB/km] @1550 nm |
|---|---|---|---|---|---|---|
| G.657 A2 standard | 1300-1324 | ≤0.092 | 8.6-9.2 | ≤1260 | ≤1.59 | |
| No. 1 Simulation | 1316 | 0.087 | 9.09 | 1259 | 1.29 | |
| No. 1 Prototype | 1314 | 0.088 | 9.11 | 1252 | 1.12 | 0.185 |
| No. 2 Simulation | 1305 | 0.091 | 9.05 | 1255 | 1.46 | |
| No. 2 Prototype | 1303 | 0.091 | 9.03 | 1249 | 1.38 | 0.187 |
| No. 3 Simulation | 1317 | 0.087 | 8.96 | 1249 | 1.18 | |

TABLE 2-continued

|  | Zero-dispersion wavelength [nm] | Dispersion slope [ps/nm²/km] @zero-dispersion wavelength | MFD [μm] @1310 nm | Cutoff wavelength [nm] @22 m | Macrobending loss [dB/m @20 mm] @1550 nm | Transmission loss [dB/km] @1550 nm |
|---|---|---|---|---|---|---|
| No. 3 Prototype | 1319 | 0.089 | 8.93 | 1241 | 1.28 | 0.188 |
| No. 4 Simulation | 1306 | 0.091 | 8.94 | 1255 | 1.12 | |
| No. 4 Prototype | 1309 | 0.091 | 8.95 | 1249 | 1.20 | 0.190 |
| No. 5 Simulation | 1313 | 0.091 | 8.95 | 1246 | 1.40 | |
| No. 5 Prototype | 1311 | 0.090 | 8.97 | 1250 | 1.30 | 0.194 |
| No. 6 Simulation | 1311 | 0.089 | 8.86 | 1248 | 1.56 | |
| No. 6 Prototype | 1313 | 0.089 | 8.88 | 1251 | 1.55 | 0.192 |
| No. 7 Simulation | 1316 | 0.086 | 8.80 | 1259 | 1.08 | |
| No. 7 Prototype | 1315 | 0.087 | 8.81 | 1254 | 1.02 | 0.191 |
| No. 8 Simulation | 1306 | 0.091 | 8.87 | 1256 | 1.45 | |
| No. 8 Prototype | 1305 | 0.092 | 8.84 | 1251 | 1.52 | 0.192 |
| No. 9 Simulation | 1314 | 0.087 | 8.84 | 1250 | 1.49 | |
| No. 9 Prototype | 1312 | 0.088 | 8.81 | 1253 | 1.43 | 0.191 |

Moreover, the prototype optical fibers have the MFDs equal to or larger than 8.8 μm, so that it is possible to prevent occurrence of non-linear optical effects in the optical fibers and ensure good connectivity. An experiment of performing fusion splicing of each of the prototype optical fibers and a standard single-mode optical fiber that meets G.652 standard was performed, and a connection loss equal to or smaller than 0.1 dB was stably obtained without any problem with respect to each of the prototype optical fibers.

Meanwhile, the present disclosure is not limited by the embodiments as described above. The present disclosure includes configurations made by appropriately combining the structural elements as described above. Further, additional advantages and modifications will readily occur to those skilled in the art. Therefore, the disclosure in its broader aspects is not limited to the embodiments as described above, and various modifications may be made.

An optical fiber according to the present disclosure is preferably applied to a field of optical communication, such as data communication and telecommunication.

According to an embodiment, it is possible to obtain an effect in which an optical fiber has low bending loss characteristics, low transmission loss characteristics, and high manufacturability.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An optical fiber comprising:
a central core portion that is made of silica based glass containing germanium (Ge);
an intermediate layer that is made of silica based glass and formed on an outer periphery of the central core portion;
a trench layer that is made of silica based glass and formed on an outer periphery of the intermediate layer; and
a cladding portion that is made of silica based glass and formed on an outer periphery of the trench layer, wherein
relationships $\Delta 1 > \Delta 2 > \Delta 3$ and $0 > \Delta 3$ are satisfied, where $\Delta 1$ is a relative refractive-index difference of the central core portion with respect to the cladding portion, $\Delta 2$ is a relative refractive-index difference of the intermediate layer with respect to the cladding portion, and $\Delta 3$ is a relative refractive-index difference of the trench layer with respect to the cladding portion,
$\Delta 1$ is equal to or larger than 0.34% and equal to or smaller than 0.37%,
$|\Delta 3|$ is equal to or larger than 0.1% and equal to or smaller than 0.25%,
$\Delta 1 \times |\Delta 3|$ is equal to or smaller than 0.08%²,
$\Delta 2$ is equal to or larger than −0.04% and equal to or smaller than 0.04%,
when a core diameter of the central core portion is 2a, and an inner diameter and an outer diameter of the trench layer are 2b and 2c, respectively, b/a is equal to or larger than 1.8 and equal to or smaller than 3.6 and c/a is equal to or larger than 4.0 and equal to or smaller than 5.0,
a mode field diameter at a wavelength of 1310 nm is equal to or larger than 8.8 μm, and
a transmission loss at a wavelength of 1550 nm is equal to or smaller than 0.195 dB/km.

2. The optical fiber according to claim 1, wherein $|\Delta 3|$ is equal to or larger than 0.1% and equal to or smaller than 0.20%.

3. The optical fiber according to claim 1, wherein b/a is equal to or larger than 2.2, and equal to or smaller than 3.4.

4. The optical fiber according to claim 1, wherein an effective cutoff wavelength is equal to or smaller than 1260 nm.

5. The optical fiber according to claim 1, wherein a core diameter of the central core portion is set such that an effective cutoff wavelength is equal to or larger than 1150 nm and equal to or smaller than 1260 nm.

6. The optical fiber according to claim 1, wherein the mode field diameter at a wavelength of 1310 nm is equal to or smaller than 9.5 μm.

7. The optical fiber according to claim 1, wherein a bending loss at a wavelength of 1550 nm when bending is made at a diameter of 20 mm is equal to or smaller than 1.59 dB/m.

8. The optical fiber according to claim 1, wherein
a zero-dispersion wavelength is equal to or larger than 1300 nm and equal to or smaller than 1324 nm, and a dispersion slope at the zero-dispersion wavelength is equal to or smaller than 0.092 ps/nm$^2$/km.

9. A method of manufacturing the optical fiber according to claim 1, the method comprising:
a step of manufacturing an optical fiber preform; and
a step of manufacturing the optical fiber by heating and melting the optical fiber preform and performing drawing, wherein
the step of manufacturing the optical fiber preform includes forming portions that serve as at least the central core portion, the intermediate layer, the trench layer, and a part of the cladding portion by using a vapor phase axial deposition method.

10. The optical fiber according to claim 1, wherein (c-b) is equal to or larger than 5.81 μm and equal to or smaller than 8.2 μm.

* * * * *